United States Patent
Munshi et al.

(10) Patent No.: US 12,404,818 B2
(45) Date of Patent: Sep. 2, 2025

(54) APPARATUS AND METHOD FOR INJECTING A PILOT FUEL INTO AN INTERNAL COMBUSTION ENGINE

(71) Applicant: HPDI TECHNOLOGY LIMITED PARTNERSHIP, Vancouver (CA)

(72) Inventors: Sandeep Munshi, Delta (CA); Michael C. Wickstone, North Vancouver (CA); Jian Huang, Surrey (CA); Ashish Singh, Surrey (CA)

(73) Assignee: HPDI Technology LP, Vancouver (CA)

( * ) Notice: Subject to any disclaimer, the term of this patent is extended or adjusted under 35 U.S.C. 154(b) by 0 days.

(21) Appl. No.: 18/575,165

(22) PCT Filed: Jun. 29, 2022

(86) PCT No.: PCT/CA2022/051042
§ 371 (c)(1),
(2) Date: Dec. 28, 2023

(87) PCT Pub. No.: WO2023/272392
PCT Pub. Date: Jan. 5, 2023

(65) Prior Publication Data
US 2024/0318608 A1    Sep. 26, 2024

Related U.S. Application Data

(60) Provisional application No. 63/216,515, filed on Jun. 29, 2021.

(51) Int. Cl.
*F02D 41/38* (2006.01)
*F02D 35/02* (2006.01)
(Continued)

(52) U.S. Cl.
CPC ....... *F02D 41/3827* (2013.01); *F02D 35/023* (2013.01); *F02D 41/0027* (2013.01); *F02D 41/401* (2013.01)

(58) Field of Classification Search
CPC .............. F02D 41/3827; F02D 35/023; F02D 41/0027; F02D 41/401
See application file for complete search history.

(56) References Cited

U.S. PATENT DOCUMENTS

| | | |
|---|---|---|
| 5,243,932 A | 9/1993 | Herrmann |
| 5,996,558 A | 12/1999 | Ouellette et al. |

(Continued)

FOREIGN PATENT DOCUMENTS

| | | |
|---|---|---|
| EP | 1255923 A1 | 4/2006 |
| EP | 3061951 A1 | 8/2016 |

(Continued)

OTHER PUBLICATIONS

International Search Report and Written Opinion for PCT/CA2022/051042 mail date of Sep. 22, 2022.

*Primary Examiner* — Lindsay M Low
*Assistant Examiner* — Charles J Brauch
(74) *Attorney, Agent, or Firm* — Carie C. Mager

(57) ABSTRACT

An apparatus and method for injection of a pilot fuel into an internal combustion engine includes a variety of steady state, transient and other techniques to reduce an injection quantity of the pilot fuel and/or a carbon content of the pilot fuel.

19 Claims, 9 Drawing Sheets

(51) Int. Cl.
*F02D 41/00* (2006.01)
*F02D 41/40* (2006.01)

(56) References Cited

U.S. PATENT DOCUMENTS

| | | | |
|---|---|---|---|
| 6,202,601 B1 * | 3/2001 | Ouellette | F02M 21/0275 |
| | | | 123/526 |
| 6,336,598 B1 | 1/2002 | Touchette et al. | |
| 2002/0166515 A1 | 11/2002 | Ancimer et al. | |
| 2003/0024246 A1 | 2/2003 | Beck et al. | |
| 2005/0011486 A1 | 1/2005 | Cueman | |
| 2006/0236974 A1 | 10/2006 | Randall | |
| 2015/0020769 A1 | 1/2015 | Huang et al. | |
| 2016/0160741 A1 | 6/2016 | Gu et al. | |
| 2016/0326970 A1 | 11/2016 | Fei et al. | |
| 2019/0032618 A1 | 1/2019 | Soleri et al. | |

FOREIGN PATENT DOCUMENTS

| | | | |
|---|---|---|---|
| JP | 2021011871 A | | 2/2021 |
| WO | WO8203891 A1 * | | 11/1982 |

* cited by examiner

APPARATUS AND METHOD FOR INJECTING A PILOT FUEL INTO AN INTERNAL COMBUSTION ENGINE

TECHNICAL FIELD

The present application relates to an apparatus and method for injecting a pilot fuel into an internal combustion engine, and more particularly for injecting the pilot fuel to ignite a gaseous fuel.

BACKGROUND

Each document, reference, patent application or patent cited in this text is expressly incorporated herein in their entirety by reference, which means that it should be read and considered by the reader as part of this text. That the document, reference, patent application or patent cited in this text is not repeated in this text is merely for reasons of conciseness.

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

High pressure gaseous fuel direct injection GFDI is a technique of introducing a gaseous fuel into a combustion chamber of an internal combustion engine. In the technique, gaseous fuel is injected directly into the combustion chamber near the latter part of a compression stroke. Accordingly, the injection pressure of the gaseous fuel needs to be greater than the pressure in the combustion chamber (also known as in-cylinder pressure) at the time of injection. Injection pressures in GFDI engines are typically 120 bar or greater. Exemplary gaseous fuels employed in GFDI engines, such as methane or natural gas, have relatively lower cetane numbers compared to diesel fuel and are not auto-ignitable within the pressure and temperature environment prevailing in the latter part of the compression stroke in conventional internal combustion engines. Accordingly, a pilot fuel such as diesel fuel can be employed as an ignition source to ignite the gaseous fuel. The pilot fuel can be injected later in the compression stroke into a pressure and temperature environment that causes the pilot fuel to auto-ignite and combust thereby creating another pressure and temperature environment suitable for igniting the gaseous fuel. The gaseous fuel can be injected before and/or after the pilot fuel. The term "and/or" is used herein to mean "one or the other or both".

The diesel-fuel substitution factor is a parameter representing the amount of diesel fuel by energy content that is substituted by the gaseous fuel when comparing a diesel engine to a pilot-ignited, gaseous fuel internal combustion engine. Typical GFDI internal combustion engines have a diesel-fuel substitution factor around 95% when the gaseous fuel is natural gas. Natural gas is predominantly methane with methane accounting for 70% or more on a per volume basis at standard temperature and pressure. However, different types of gaseous fuel have different properties and a common diesel-fuel substitution factor may not be appropriate for a variety of gaseous fuels.

The state of the art is lacking in techniques for injecting a pilot fuel into an internal combustion engine, and more particularly for injecting the pilot fuel to ignite a gaseous fuel. The present apparatus and method provide a technique for injecting a pilot fuel into an internal combustion engine.

SUMMARY

An improved apparatus and method for injection of a pilot fuel into an internal combustion engine includes a variety of steady state, transient and other techniques to reduce an injection quantity of the pilot fuel and/or a carbon content of the pilot fuel. The steady state techniques include reducing a number of pilot holes; reducing a diameter of pilot holes; increasing a length of pilot holes; reducing a flow area through a pilot injection valve, for example by reducing a stroke length of a pilot needle or a seat diameter of a valve seat in the pilot injection valve; increasing a roughness of an inner surface of pilot holes; employing inwardly tapering (outwardly diverging) pilot holes; and employing cross-sectional shapes that reduce the coefficient of discharge of pilot holes compared to the circular shape. The transient techniques include decreasing pilot fuel pressure; improving a transient response of a pilot actuation mechanism; and employing partial lift of a pilot needle during injection to reduce flow area through the pilot injection valve. The other techniques include employing an orifice or a match-fit to allow a desired flow rate of pilot fuel into a gaseous-fuel plenum such that a gaseous-fuel/pilot-fuel mixture forms and can be injected through a single injection valve; reducing the carbon content of the pilot fuel by using pilot fuels other than diesel that have a lower carbon content, or mixing the pilot fuel (for example, diesel fuel) with non-carbon fluids such as an inert fluid or ammonia; using separate and different injectors for injecting pilot fuel and gaseous fuel; employing a cascade injection strategy; and employing various combinations of the above techniques based on different engine speed and engine load conditions such that the engine maintains good ignition stability of the gaseous fuel for example at 50% full load.

One general aspect includes a method of operating a gaseous fueled direct injection diesel cycle internal combustion engine introducing a quantity of gaseous fuel directly into a combustion chamber of the engine, where the gaseous fuel may include at least 60% hydrogen by volume at standard temperature and pressure, introducing a quantity of pilot fuel directly into the combustion chamber of the engine, such that the quantity of pilot fuel has a pilot energy ratio of less than 3% of the total fuel introduced for at least one engine operating condition; and igniting the pilot fuel where the combustion of the pilot fuel triggers the ignition of the gaseous fuel.

The method may include one or more of the following features. The method where the gaseous fuel is at least 97% on an energy basis of the total fuel introduced for at least one engine operating condition. The method may include maintaining a pilot fuel rail pressure to in-cylinder pressure ratio of at least 2.0:1 when introducing the pilot fuel into the combustion chamber for at least one engine operating condition. The quantity of pilot fuel has a pilot energy ratio of 2.09% or less of the total fuel introduced for at least one engine operating condition. The quantity of pilot fuel has a pilot energy ratio of 1.04% or less of the total fuel introduced for at least one engine operating condition. The quantity of pilot fuel has a pilot energy ratio of between 0.26% and 2.09%, and more preferably, between 0.26% and 1.04% of the total fuel introduced for at least one engine operating condition. The engine maintains good ignition stability of the gaseous fuel for full load to low load operating conditions, with an exemplary operating point for comparison being at a mid-load point of 50% of full load. Over an engine operating map the pilot fuel is on average between 0.26% and 3% of the fuel that is consumed by the engine on an energy basis, and more preferably between 0.26% and 2.09% of the fuel that is consumed by the engine on an energy basis. The gaseous fuel may include greater than 60% hydrogen by volume at standard temperature and pressure. The gaseous fuel may include between 60% and 100% hydrogen by volume at standard temperature and pressure. The gaseous fuel may include between 70% and 100% hydrogen by volume at standard temperature and pressure. The gaseous fuel may include between 80% and 100% hydrogen by volume at standard temperature and pressure. The gaseous fuel may include between 90% and 100% hydrogen by volume at standard temperature and pressure. The gaseous fuel may include substantially hydrogen by volume at standard temperature and pressure. The method of any preceding example, may include injecting all the fuel during the compression stroke; and/or injecting pilot fuel with advanced injection timing by injecting the pilot fuel earlier during the compression stroke when the in-cylinder pressure is less than peak in-cylinder pressure. The method of any preceding example, may also include injecting pilot fuel directly into the combustion chamber about 1 millisecond before start of injection of the gaseous fuel.

Another general aspect includes an apparatus for injecting a pilot fuel into a combustion chamber of an internal combustion engine which burns pilot fuel and a main gaseous fuel in the combustion chamber. The apparatus includes a fuel injector including a pilot injection valve having a pilot needle and a pilot valve-seat, and has a plurality of pilot holes for fluidly communicating the pilot fuel from the pilot-injection valve into the combustion chamber such that a quantity of pilot fuel injected is less than 2.09% of a total fuel quantity defined as a sum of the quantity of pilot fuel and a quantity of the main gaseous fuel on an energy basis for stable ignition of the main gaseous fuel injected during an engine cycle. The quantity of pilot fuel injected can be within a range of 0.26% and 2.09% of a total fuel quantity on an energy basis, and in other examples can be within a range of 0.26% and 1.04% of the total fuel quantity on an energy basis.

Another general aspect includes a method for injecting a pilot fuel into a combustion chamber of an internal combustion engine. The method also includes introducing a quantity of main gaseous fuel into a combustion chamber of the engine. The method also includes introducing a quantity of pilot fuel which is more readily ignitable than the main gaseous fuel, directly into the combustion chamber of the engine. The method also includes igniting the pilot fuel where the combustion of the pilot fuel triggers the ignition of the gaseous fuel. The method also includes where the quantity of pilot fuel is 2.09% or less of a total fuel quantity, the total fuel quantity being a sum of the quantity of pilot fuel and the quantity of main gaseous fuel injected per engine cycle on an energy basis. Additional exemplary methods may include one or more of the following features. The method where the quantity of pilot fuel is within a range of 0.26% and 2.09% of the total fuel quantity. The quantity of pilot fuel is within a range of 0.26% and 1.04% of the total fuel quantity. The main gaseous fuel may include greater than 60% hydrogen by volume at standard temperature and pressure; and in some examples preferably greater than 70% hydrogen by volume at standard temperature and pressure; and in other examples more preferably greater than 80% hydrogen by volume at standard temperature and pressure. The main gaseous fuel may include greater than 90% hydrogen by volume at standard temperature and pressure in still other examples. The method may include injecting all the fuel during the compression stroke. The method may include providing a number of pilot holes less than a number of pilot holes in another fuel injector; the other fuel injector includes a second pilot-injection valve having a second pilot needle and a second pilot valve-seat, and a plurality of second pilot holes for fluidly communicating pilot fuel from the second pilot-injection valve into the combustion chamber; and the other fuel injector injects a pilot quantity associated with a pilot energy ratio of greater than 3% on an energy basis to maintain good ignition stability of the gaseous fuel as measured at 50% full load. The method may include providing a number of pilot holes each having a diameter less than a diameter of a pilot hole in another fuel injector which injects a pilot quantity associated with a pilot energy ratio of greater than 3% on an energy basis to maintain good ignition stability of the gaseous fuel as measured at 50% full load. The method may include providing a pilot stroke length less than a pilot stroke length of a second pilot-injection valve in another fuel injector where the other fuel injector injects a pilot quantity associated with a pilot energy ratio of greater than 3% on an energy basis to maintain good ignition stability of the gaseous fuel as measured at 50% full load. The method may include providing a pilot valve-seat diameter sized less than a second pilot valve-seat diameter of a second pilot-injection valve in another fuel injector which injects a pilot quantity associated with a pilot energy ratio of greater than 3% on an energy basis to maintain good ignition stability of the gaseous fuel as measured at 50% full load. The method may include providing a roughness of inner surfaces of the plurality of pilot holes greater than a roughness of inner surfaces of a plurality of second pilot holes of a second pilot-injection valve in another fuel injector which injects a pilot quantity associated with a pilot energy ratio of greater than 3% on an energy basis to maintain good ignition stability of the gaseous fuel for as measured at 50% full load. The method may include providing each of the plurality of pilot holes of the fuel injector with an inwardly tapering profile. The method may include providing each of the plurality of pilot holes having a cross-sectional profile having a reduced discharge coefficient compared to a discharge coefficient of a second cross-sectional profile of a plurality of second pilot holes in another fuel injector. The method may include injecting the pilot fuel at a lower injection pressure for an engine load and engine speed condition compared to an injection pressure employed with another fuel injector for the same engine load and engine speed condition. The method may include actuating the pilot needle to a partial lift position between a seated position and a fully open position. The method may include providing the pilot fuel with a lower carbon content compared to a carbon content of another pilot fuel. The method may include mixing the pilot fuel with an inert fluid; and/or mixing the pilot fuel with ammonia. The other fuel injector in the examples can be a dual fuel injector employed in the internal combustion engine which operates with an average pilot energy ratio of approximately 5% for a standard drive cycle which can be an engine test cell verifiable drive cycle including transient cycle data and/or can emulate typical real-world driving conditions such as.the Boras-Landvetter-Boras drive cycle and/or the Hamburg-Kessel drive cycle.

The invention is not limited to the summary of the invention above and includes further features disclosed in the embodiments in the written description of exemplary embodiments herein. Features and advantages of the disclosed apparatus, systems, and methods will become apparent from the following description. Applicant is providing this description, which includes drawings and examples of specific embodiments, to give a broad representation of the apparatus, systems, and methods. Various changes and modifications of the application will become apparent to those skilled in the art from this description and by practice of the apparatus, systems, and methods.

BRIEF DESCRIPTION OF THE DRAWINGS

The accompanying drawings, which are incorporated into and constitute a part of the specification, illustrate specific embodiments of the apparatus, systems, and methods and, together with the general description above, and the detailed description of the specific embodiments, serve to explain the principles of the apparatus, systems, and methods.

DETAILED DESCRIPTION

Figure 1:
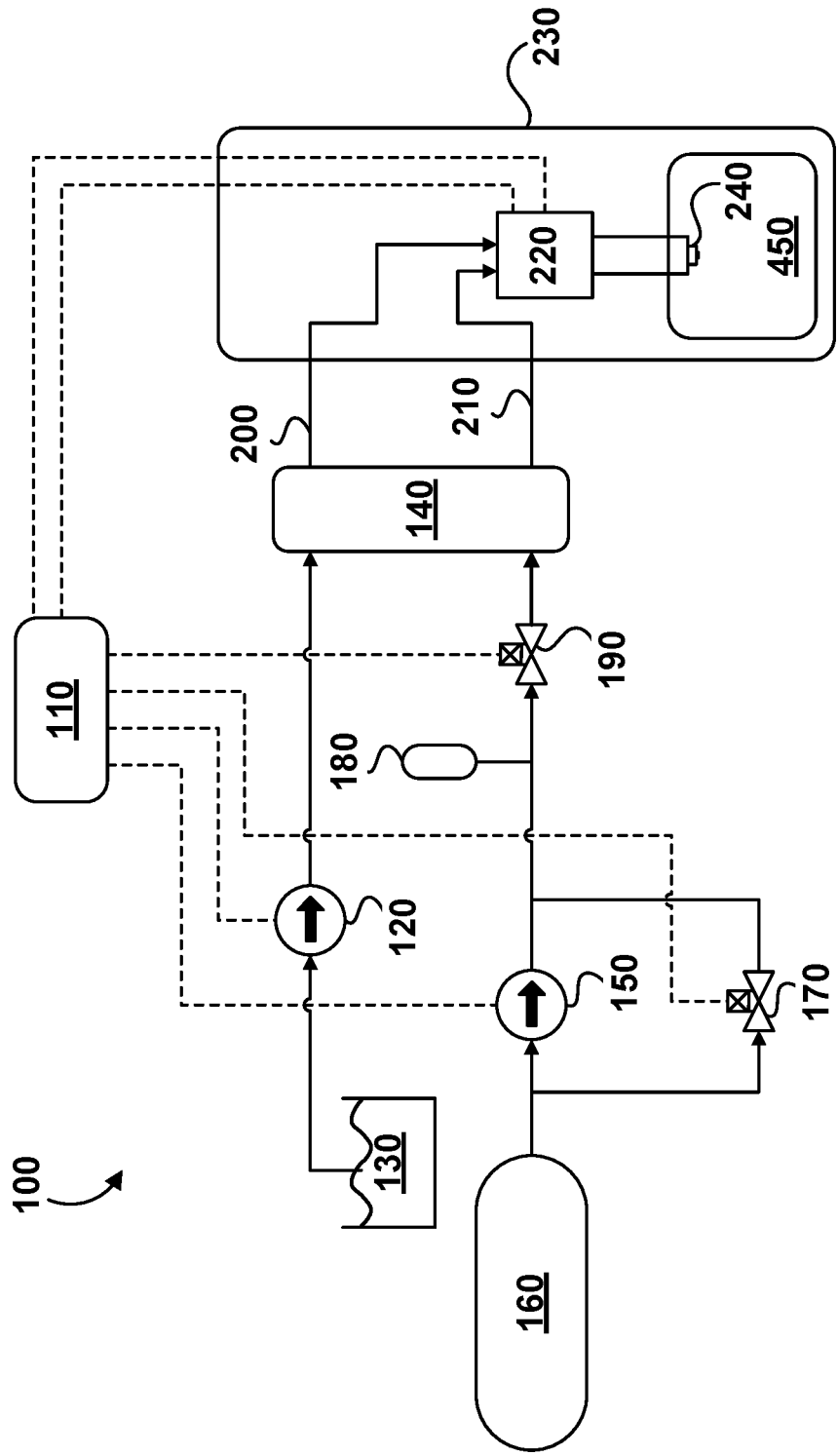
FIG. 1 is a schematic view of a fuel system for an internal combustion engine according to an embodiment.

Referring to FIG. 1, fuel system 100 is illustrated according to one embodiment for supplying fuel to internal combustion engine 230. Pumping apparatus 120 pressurizes liquid fuel from liquid-fuel storage vessel 130 and delivers the pressurized liquid fuel to fuel-pressure regulating apparatus 140. Pumping apparatus 120 can include a transfer pump located in liquid fuel storage vessel 130, an inlet metering valve and a common rail pump, in addition to other fuel system components known to those skilled in the technology. Pumping apparatus 150 pressurizes gaseous fuel from storage vessel 160 and delivers it to fuel-pressure regulating apparatus 140. Storage vessel 160 is preferably a pressure cylinder that stores the gaseous fuel as a compressed gas. Typical storage pressures at which refueling stations can pressurize storage vessel 160 are 300 bar and 700 bar; however, other refueling storage pressures, both higher and lower and in between, are contemplated. Bypass valve 170 permits gaseous fuel from storage vessel 160 to bypass pumping apparatus 150 when opened, for example when gaseous fuel pressure in storage vessel 160 is high; and when gaseous fuel pressure is low bypass, valve 170 can be closed and pumping apparatus 150 actuated to pressurize the gaseous fuel to a desired pressure. In other embodiments storage vessel 160 can store the gaseous fuel in liquefied form whereby pumping apparatus 150 can be a cryogenic pumping apparatus that pressurizes and preferably vaporizes the liquefied gaseous fuel, and in this circumstance bypass valve 170 is not required. Accumulator 180 stores a desired volume of pressurized gaseous fuel as a buffer against fuel demand from internal combustion engine 230, which may be a vessel or appropriately sized piping supplying fuel from pumping apparatus 150. Shut-off valve 190 is employed to isolate accumulator 180 from the downstream fuel system when the internal combustion engine is shut down. Fuel-pressure regulating apparatus 140 is employed to maintain a differential pressure between liquid fuel pressure in liquid-fuel rail 200 and gaseous fuel pressure in gaseous-fuel rail 210 within a desired range (where liquid fuel pressure is greater than gaseous fuel pressure by at least a desired margin), such that the liquid fuel can be employed in liquid seals to seal the gaseous fuel within dual fuel injector 220, as is known to those skilled in the technology. The differential pressure is also known as system bias pressure. U.S. Pat. No. 6,298,833, issued on Oct. 9, 2001, and owned by the Applicant, discloses various embodiments of exemplary fuel-pressure regulating apparatuses 140 that can be employed herein, although other techniques for maintaining a pressure bias between two fuels can also be employed. These techniques are known generally as either gas-follows-diesel (GFD) and diesel-follows-gas (DFG), in which the second listed fuel refers to the fuel whose pressure is regulated based on the pressure of the first listed fuel. Dual fuel injector 220 is fluidly connected with liquid-fuel rail 200 and gaseous-fuel rail 210 and is operative to separately and independently inject liquid fuel and gaseous fuel from nozzle 240 into combustion chamber 450, where nozzle 240 of dual fuel injector 220 is disposed. In a typical embodiment, fuel injector 220 employs the liquid fuel as a hydraulic fluid for actuating the injector and for forming liquid seals to seal the gaseous fuel within the injector, and accordingly the system bias pressure between the liquid fuel and the gaseous fuel is maintained within the desired range to operate the fuel injector. The liquid fuel is also employed as a pilot fuel to burn within the combustion chamber to establish a pressure and temperature environment suitable for igniting the gaseous fuel, whereby the terms liquid fuel and pilot fuel are used interchangeably herein. Although only one such fuel injector is illustrated, there can be a plurality of fuel injectors in other embodiments associated with respective combustion chambers. Electronic controller 110 is operatively connected with pumping apparatuses 120 and 150, bypass valve 170, shut-off valve 190 and fuel injector 220 to command their operation.

Figure 2:
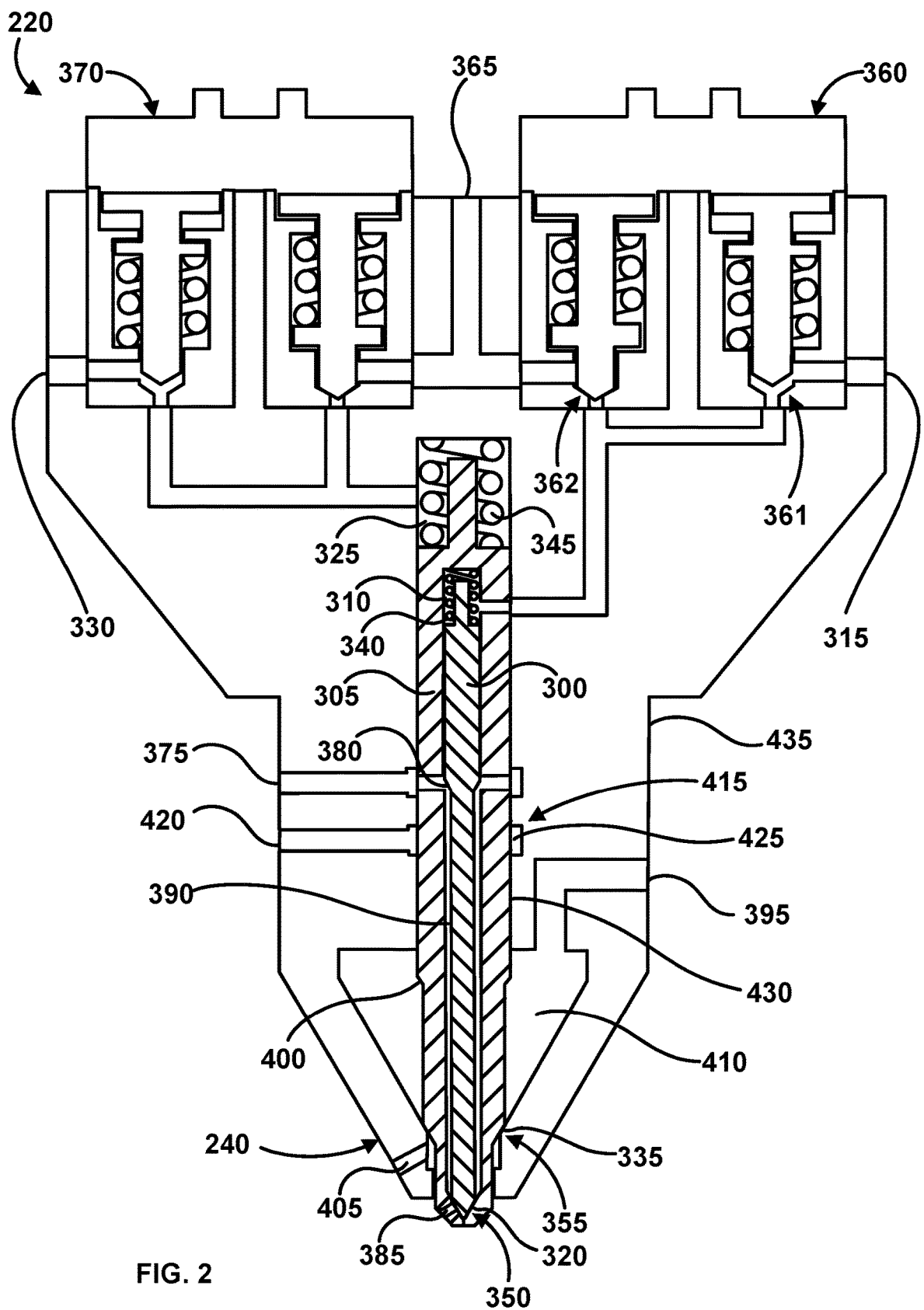
FIG. 2 is a schematic view of a fuel injector of the fuel system of FIG. 1.

Referring now to FIG. 2 there is shown dual-fuel injector 220 in an exemplary embodiment illustrating pilot needle 300 concentrically nested inside main needle 305 (for the gaseous fuel). Pilot control-chamber 310 is filled with pressurized hydraulic fluid from hydraulic fluid inlet 315 to urge pilot needle 300 onto pilot valve seat 320. Main control-chamber 325 is filled with pressurized hydraulic fluid from inlet 330 to urge main needle 305 onto main valve seat 335.

Figure 3:
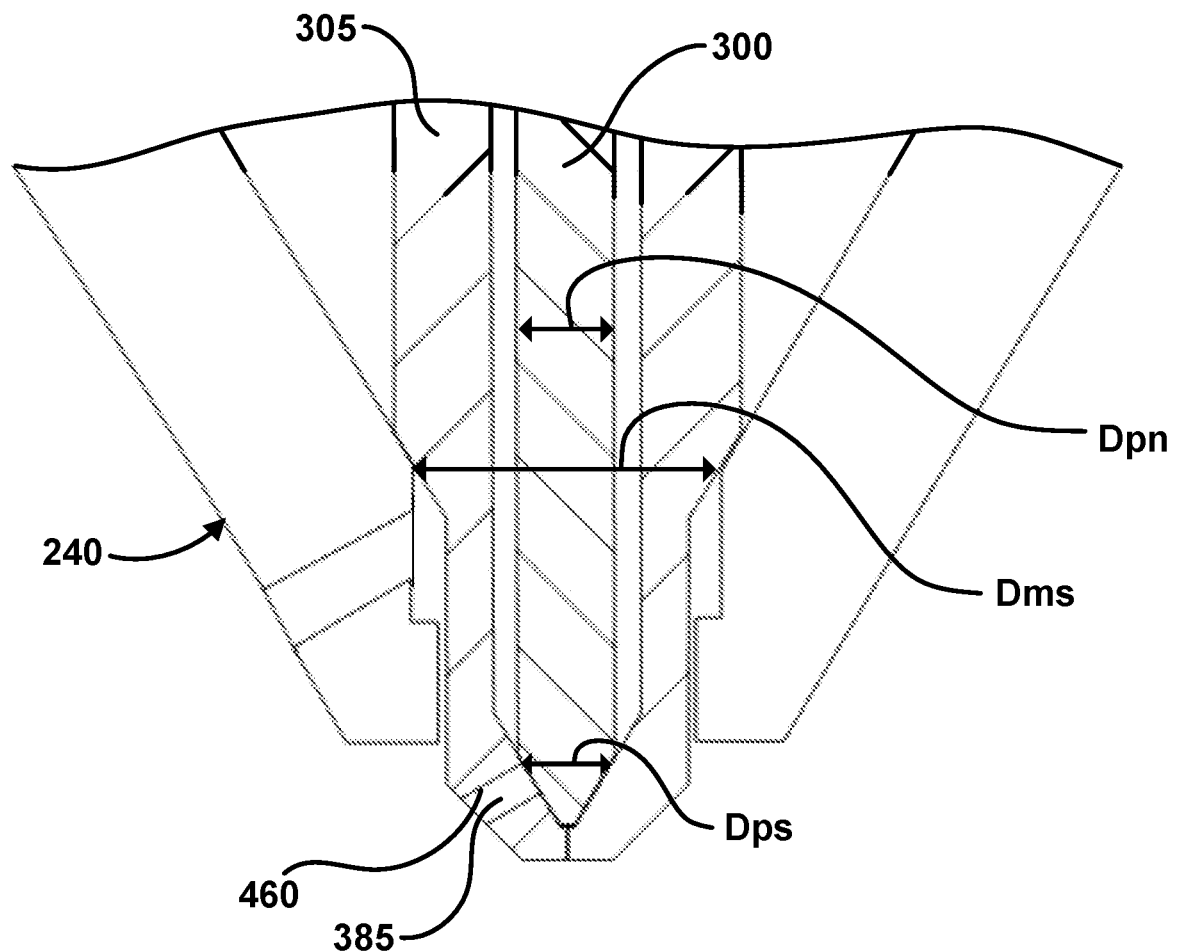
FIG. 3 is a detailed view of a nozzle of the fuel injector of FIG. 2.

Pilot needle 300 and pilot valve seat 320 together form pilot injection-valve 350 for injecting a pilot quantity of fuel. Main needle 305 and main valve seat 335 together form main injection-valve 355 for injecting a main quantity of fuel. Springs 340 and 345 urgingly bias needles 300 and 305 onto valve seats 320 and 335, respectively, such that injection valves 350 and 355 are in a closed position in the absence of pressurized hydraulic fluid. Valve seats 320 and 335 are annular in shape and are defined by pilot and main sealing diameters, referred to as Dps and Dms, respectively (best seen in FIG. 3) that are the smallest diameters where needles 300 and 305 make contact with pilot valve seat 320 and with main valve seat 335, respectively, when injection valves 350 and 355 are in the closed position. Returning to FIG. 2, pilot actuation mechanism 360 is a three-way valve-type mechanism operatively connected to controller 110 (for actuation by the controller) that when unenergized allows fluid communication of pressurized hydraulic fluid from inlet 315 to pilot control-chamber 310, and when energized allows fluid communication of hydraulic fluid from pilot control-chamber 310 to hydraulic fluid outlet 365 that can be connected to a return line for fluidly returning hydraulic fluid to reservoir, which when the hydraulic fluid is the pilot fuel can be liquid-fuel storage vessel 130 (seen in FIG. 1). Main actuation mechanism 370 is a three-way valve-type mechanism that is operatively connected to controller 110 (for actuation by the controller) that when unenergized allows fluid communication of pressurized hydraulic fluid from inlet 330 to main control-chamber 325, and when energized allows fluid communication of hydraulic fluid from main control-chamber 325 to hydraulic fluid outlet 365. When pilot and main actuation mechanisms 360 and 370 are unenergized, control chambers 310 and 325, respectively, are blocked from hydraulic fluid outlet 365. When pilot and main actuation mechanisms 360 and 370 are energized, control chambers 310 and 325 are blocked from hydraulic fluid inlets 315 and 330, respectively.

Figure 4:
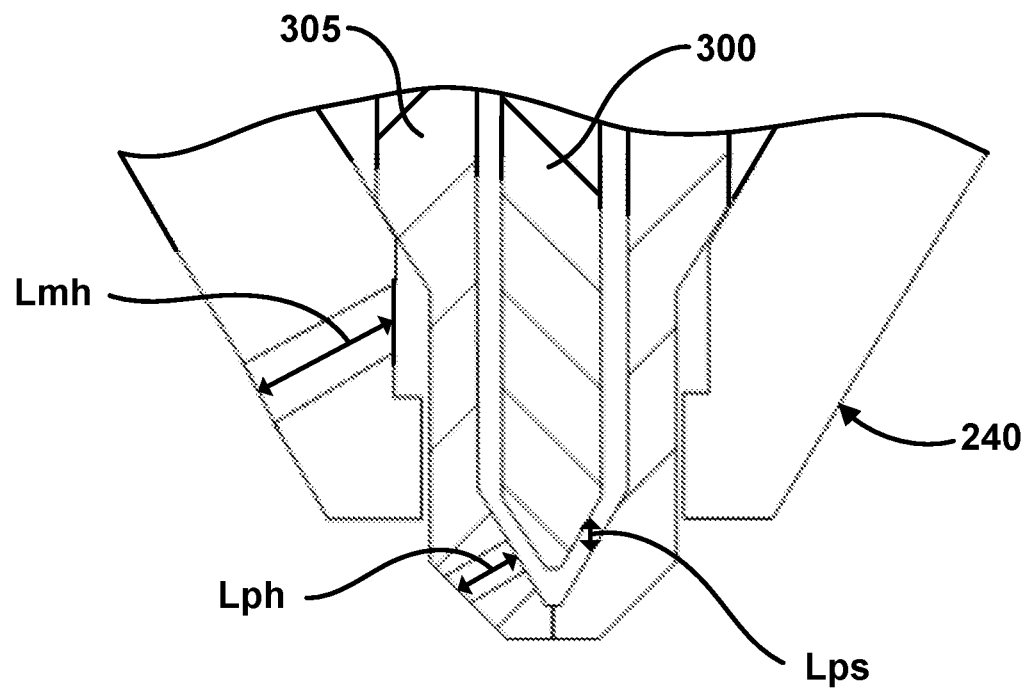
FIG. 4 is a detailed view of a nozzle of the fuel injector of FIG. 2 with a pilot injection valve shown in an open position.
Figure 5:
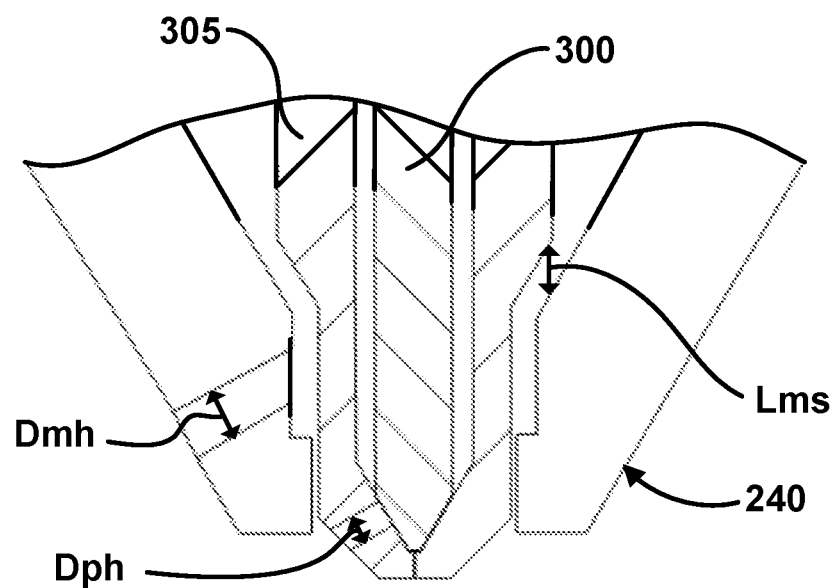
FIG. 5 is a detailed view of a nozzle of the fuel injector of FIG. 2 with a main injection valve shown in an open position.
Figure 6:
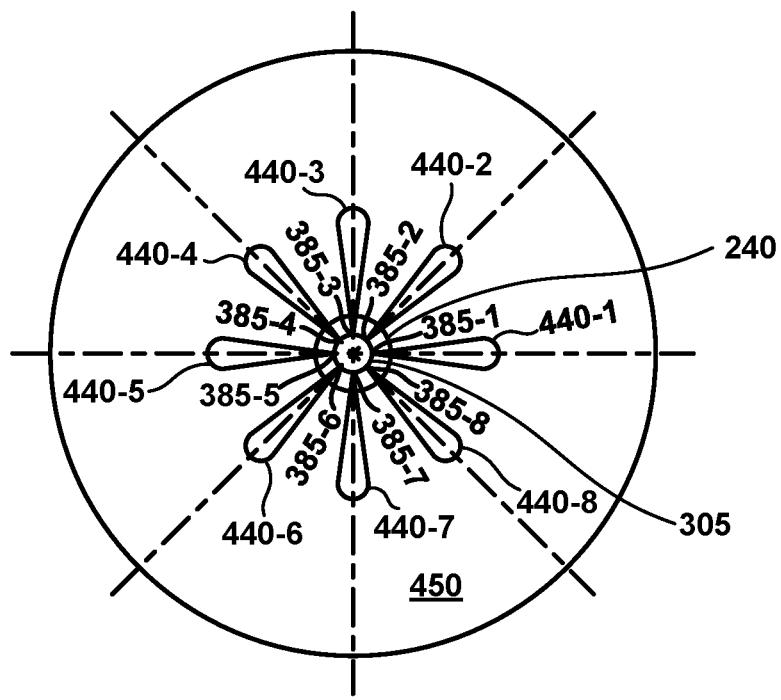
FIG. 6 is a plan view of a combustion chamber illustrating pilot jets injected by a fuel injector.

Pilot fuel is delivered to fuel injector 220 through pilot fuel inlet 375 and fluidly communicated from inlet 375 through annular passageway 390 between pilot needle 300 and main needle 305 to pilot injection valve 350. In the illustrated embodiment, when pilot actuation mechanism 360 is energized, hydraulic fluid pressure in pilot control chamber 310 decreases to that of hydraulic drain pressure (that is, the pressure at hydraulic fluid outlet 365), whereby pilot fuel pressure exerts a lifting force on ledge 380 of pilot needle 300 such that the pilot needle lifts off of valve seat 320 by a pilot stroke length Lps (best seen in FIG. 4) allowing pilot fuel to be injected through pilot hole 385 in main needle 305. Pilot hole 385 can have a cylindrical shape having a pilot-hole diameter Dph (best seen in FIG. 5) and a pilot-hole length Lph (best seen in FIG. 4). Although there is only one pilot hole 385 illustrated in FIG. 2, it is understood that there can be one or more pilot holes in fuel injector 220. With reference to FIG. 6, in an exemplary embodiment there are eight pilot holes 385-1, 385-2, 385-3, 385-4, 385-5, 385-6, 385-7, and 385-8 that inject eight pilot jets 440-1, 440-2, 440-3, 440-4, 440-5, 440-6, 440-7, and 440-8, respectively into combustion chamber 450.

Figure 7:
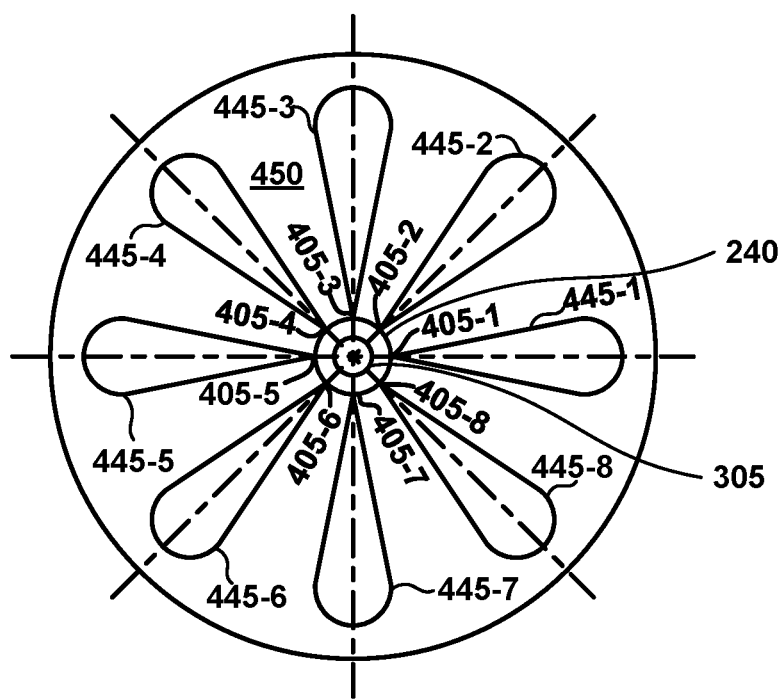
FIG. 7 is a plan view of the combustion chamber illustrating main jets injected by the fuel injector of FIG. 6.

Returning to FIG. 2, gaseous fuel is delivered to fuel injector 220 through gaseous fuel inlet 395 and fluidly communicated into gaseous-fuel plenum 410, which is an annular chamber around main needle 305 that acts as an accumulator or buffer of gaseous fuel close to main injection valve 355. When main actuation mechanism 370 is energized, hydraulic fluid pressure in main control chamber 325 decreases to hydraulic drain pressure, whereby gaseous fuel pressure exerts a lifting force on ledge 400 of main needle 305 such that the main needle lifts off valve seat 335 by a main stroke length Lms (best seen in FIG. 5) allowing gaseous fuel to be injected through main hole 405. Main hole 405 has a cylindrical shape defined by a main-hole length Lmh (best seen in FIG. 4) and a main-hole diameter Dmh (best seen in FIG. 5). Although there is only one main hole 405 illustrated in FIG. 2, it is understood that there can be one or more main holes in fuel injector 220. With reference to FIG. 7, in an exemplary embodiment there are eight main holes 405-1, 405-2, 405-3, 405-4, 405-5, 405-6, 405-7, and 405-8 that inject eight main jets 445-1, 445-2, 445-3, 445-4, 445-5, 445-6, 445-7, and 445-8, respectively of gaseous fuel into combustion chamber 450. In the illustrated embodiment, pilot jets 405-1, 405-2, 405-3, 405-4, 405-5, 405-6, 405-7, and 405-8 (angularly) overlap main jets 445-1, 445-2, 445-3, 445-4, 445-5, 445-6, 445-7, and 445-8, respectively.

Returning to FIG. 2, annular liquid seal 415 is formed around main needle 305 when pressurized hydraulic fluid from inlet 420 is delivered to annular chamber 425 around the main needle. Liquid seal 415 seals the gaseous fuel in plenum 410 and prevents the gaseous fuel from traveling through match fit 430 between main needle 305 and injector body 435 into passageway 390 or into control chambers 310 and 325.

In an exemplary embodiment, hydraulic-fluid inlets 315, 330 and 420 preferably are the same hydraulic-fluid inlet. In another exemplary embodiment, the hydraulic fluid is the pilot fuel, whereby hydraulic fluid inlets 315, 330, 420 and pilot fuel inlet 375 can be the same inlet supplying pilot fuel to fuel injector 220.

An exemplary gaseous fuel that is particularly contemplated to be employed with fuel system 100 is hydrogen. In contrast to natural gas, a hydrogen/air mixture has a substantially lower minimum ignition energy than that for a natural-gas/air mixture. A model computational fluid dynamics (CFD) study was performed to determine a minimum quantity of pilot fuel required to ignite the hydrogen/air mixture at a rated power represented by a fixed amount of hydrogen injected by dual fuel injector 220. The study was for a V13 engine for one specific engine condition (peak power at 1600 rpm). It should be noted that pilot fuel quantities and minimum pilot fuel quantities having good ignition stability will generally vary depending on engine speed and engine load and will also vary between different types of engines. The pilot fuel used in the study was diesel fuel and the results are tabulated in Table 1 below. Pilot quantity and hydrogen quantity represents the amount of pilot fuel and hydrogen injected per engine cycle (where all the fuel is injected during the compression stroke). Comparing two different fuels on an energy basis refers to comparing their respective energy content. A total pilot fuel energy for a drive cycle is equal to a low heating value of the pilot fuel multiplied by a total mass of the pilot fuel injected for the drive cycle. A total gaseous fuel energy for the drive cycle is equal to a low heating value of the gaseous fuel multiplied by a total mass of the gaseous fuel injected for the drive cycle. A total fuel energy for the drive cycle is equal to the total pilot fuel energy plus the total gaseous fuel energy. Pilot energy ratio represents a percentage of an energy content of the pilot fuel divided by a total energy content of the pilot fuel and the main fuel together injected during each engine cycle. In the present study the pilot fuel is diesel and the main fuel is substantially hydrogen. Ignition stability is defined by consistent ignition delay from cycle to cycle that is less than an upper ignition delay limit. The pilot fuel energy ratio can be as low as 0.26% for good ignition stability when internal combustion engine 230 is fueled with hydrogen. This is more than an order of magnitude less than typical commercial GFDI engines fueled with natural gas that operate with an average pilot energy ratio of around 5%. Returning to Table 1, below the pilot fuel energy ratio of 0.26% the ignition delay is above the upper ignition delay limit for consistent ignition stability from cycle to cycle.

TABLE 1

| Pilot Quantity (mg/cycle) | Hydrogen Quantity (mg/cycle) | Pilot Energy Ratio (%) | Ignition Stability |
|---|---|---|---|
| 5.34 | 92 | 2.09 | Good |
| 2.67 | 92 | 1.04 | Good |
| 1.34 | 92 | 0.52 | Good |
| 0.67 | 92 | 0.26 | Good |
| 0.33 | 92 | 0.13 | Long Delay |
| 0.17 | 92 | 0.07 | Long Delay |

Accordingly, burning a hydrogen/air mixture in internal combustion engine 230 permits smaller amounts of pilot fuel to be employed, as compared to a comparable internal combustion engine in which natural gas is the gaseous fuel. Additionally, pilot fuel quantities employed to ignite gaseous fuel blends comprising predominantly hydrogen permit smaller amounts of pilot fuel to be employed as compared to a comparable internal combustion engine in which natural gas is employed as the gaseous fuel, where natural gas is a gaseous fuel blend of predominantly methane. Gaseous fuel blends comprising predominantly hydrogen can include gaseous fuel comprising between 60% and 100% hydrogen by volume at standard temperature and pressure in some arrangements; between 70% and 100% hydrogen by volume at standard temperature and pressure in other arrangements; between 80% and 100% hydrogen by volume at standard temperature and pressure in still other arrangements; between 90% and 100% hydrogen by volume at standard temperature and pressure in other arrangements; and substantially hydrogen in still other arrangements. A natural gas fueled engine is fueled with a gaseous fuel blend of predominantly methane and can comprise at least 70% methane by volume at standard temperature and pressure. Burning smaller amounts of pilot fuel reduces emissions, particularly greenhouse gas (GHG) emissions, since gaseous fuel burns with fewer emissions compared to typical pilot fuels like diesel fuel. Burning less pilot fuel also reduces the frequency of replenishing liquid-fuel storage vessel 130 (seen in FIG. 1), thereby reducing the burden of operating internal combustion engine 230, and/or allowing for a smaller liquid-fuel storage vessel 130 thereby reducing the cost of fuel system 100. Accordingly, it is desirable that smaller amounts of pilot fuel are injected into the combustion chambers of internal combustion engine 230 per engine cycle.

A minimum pilot quantity can be determined experimentally by running an engine in steady state at given torque-load points with progressively less pilot until one of the following occurs: (1) combustion stability measured by the coefficient of variation (COV) of indicated mean effective pressure (IMEP), either cycle-to-cycle or cylinder-to-cylinder, increases above a limit; (2) emissions (for example unburned hydrocarbons (UHC) or carbon monoxide (CO) increase above a limit; and/or (3) change in combustion phasing (delayed ignition) or sharp rise in rate of heat release (due to longer ignition delay).

The following steady state techniques have been contemplated to reduce an injection quantity of pilot fuel.

Figure 8:
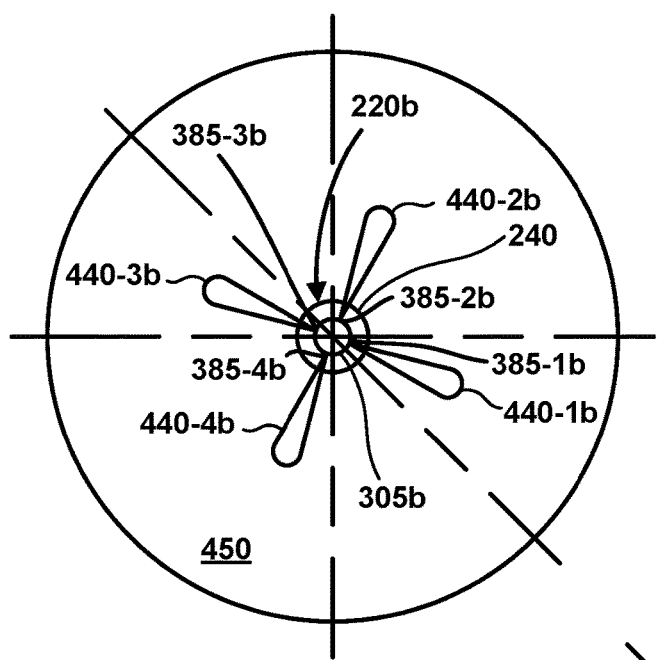
FIG. 8 is a plan view of a combustion chamber of an engine of FIG. 1 illustrating pilot jets injected by the fuel injector of FIG. 2.
Figure 9:
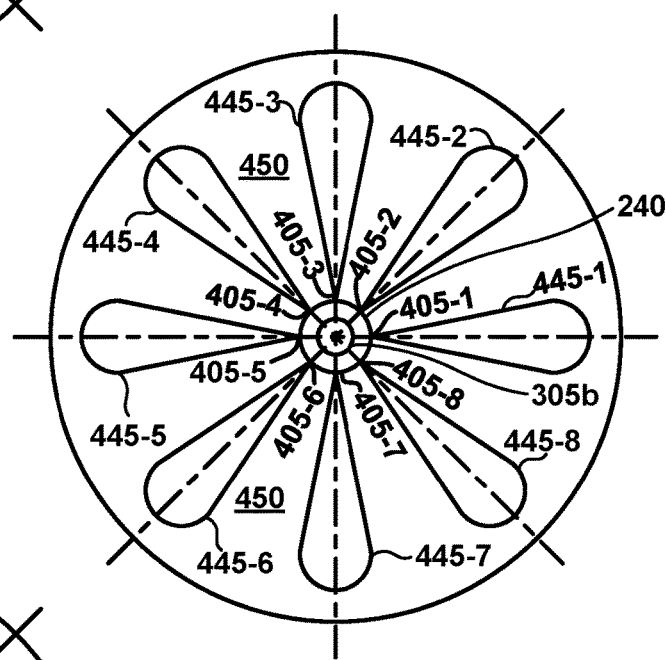
FIG. 9 is a plan view of the combustion chamber of the engine of FIG. 1 illustrating main jets injected by the fuel injector of FIG. 2.
Figure 10:
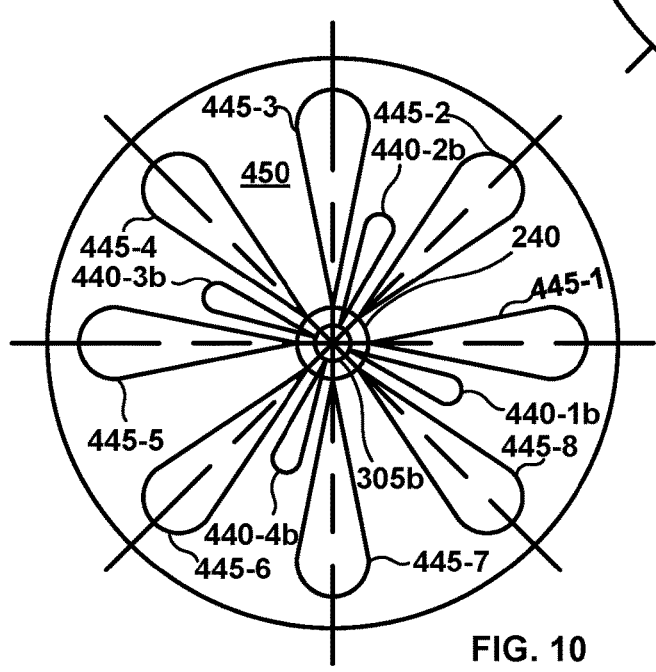
FIG. 10 is a plan view illustrating the pilot jets of FIG. 8 and the main jets of FIG. 9 overlaid with each other.

Referring to FIGS. 8, 9 and 10, there is shown another pilot and main hole embodiment that can be employed with fuel injector 220 illustrated in combustion chamber 450. Pilot injection quantity can be decreased by reducing a number of pilot holes from a number of pilot holes of another known fuel injector. With reference to FIG. 8, there are four pilot holes 385-1b, 385-2b, 385-3b, and 385-4b; and with reference to FIG. 9, there are eight main holes 405-1, 405-2, 405-3, 405-4, 405-5, 405-6, 405-7, and 405-8. Preferably, respective pilot holes are located between respective pairs of main holes. For example, pilot hole 385-1b can be located angularly between main holes 405-8 and 405-1; and pilot hole 385-2b can be located angularly between main holes 405-2 and 405-3; and pilot hole 385-3b can be located angularly between main holes 405-4 and 405-5; and pilot hole 385-4b can be located angularly between main holes 405-6 and 405-7. FIG. 10 illustrates the pilot jets of FIG. 8 and the main jets of FIG. 9 overlaid with each other. By employing fewer pilot holes, all else remaining the same, the quantity of pilot fuel introduced into combustion chamber 450 decreases. More particularly, when there are half as many pilot holes the quantity of pilot fuel injected decreases by 50%. In general, the number of pilot holes can equal half the number of main holes when there are an even number of main holes, and when there are an odd number of main holes the number of pilot holes is equal to the number of main holes divided by two and rounded up (for example, 7 main holes divided by 2 equals 3.5 and rounded up equals 4 pilot holes). Preferably, the angular spacing of the main holes is equidistant about a longitudinal axis of combustion chamber 450, and the angular spacing of the pilot holes is equidistant about the longitudinal axis of combustion chamber 450. In other embodiments, there can be an equivalent number of pilot holes to main holes with fewer main holes employed.

Another steady state technique to reduce the pilot injection quantity is to reduce pilot-hole diameter Dph (seen in FIG. 5), for example by up to 50% a pilot-hole diameter of another fuel injector employed in a GFDI engine system. In an exemplary embodiment, pilot hole diameter Dph can be reduced from between 100-120 micrometers (micron) to between 60-80 micrometers. There are various manufacturing methods suitable for making small diameter pilot holes, such as laser drilling. Increasing pilot hole length Lph (seen in FIG. 4), compared to a pilot hole length of another fuel injector employed in a GFDI engine system, can also lead to reduced pilot injection quantity all else remaining the same. For the (ideal) liquid fuel, there is typically no "choked flow" condition through pilot injection valve 350. The pilot fuel mass flow rate can be estimated using Bernoulli's equation, which is a function of the differential pressure across pilot hole 385. The longer pilot hole has a decreased discharge coefficient so there is a slight reduction of the flow rate. The risk of coking the longer pilot hole may be higher as there will be more pilot fuel remaining in the passage after injection.

The injection quantity of pilot fuel can be decreased by reducing a pilot-fuel flow area through pilot-fuel injection valve 350. The pilot-fuel flow area through injection valve 350 can be reduced by reducing pilot stroke length Lps (seen in FIG. 4) compared to a pilot stroke length of another fuel injector employed in a GFDI engine system. Another technique for reducing the pilot-fuel flow area through pilot-fuel injection valve 350 includes reducing pilot sealing diameter Dps (seen in FIG. 3) compared to a pilot sealing diameter of another fuel injector. This can be accomplished by decreasing pilot needle diameter Dpn (seen in FIG. 3) compared to a pilot needle diameter of another fuel injector employed in a GFDI engine system.

Yet another steady state technique for reducing pilot injection quantity involves increasing a roughness of inner surface 460 of pilot hole 385 (seen in FIG. 3) thereby decreasing a coefficient of discharge for pilot hole 385 compared to a coefficient of discharge for a pilot hole 385 having a roughness of the inner surface of another fuel injector employed in a GFDI engine system. As used herein, the coefficient of discharge (also known as discharge coefficient or efflux coefficient) is defined as a ratio of an actual discharge to a theoretical discharge, that is, a ratio of a mass flow rate at the discharge end of pilot hole 385 to that of an ideal pilot hole which expands an identical working fluid from identical initial conditions to identical exit pressures.

Figure 11:
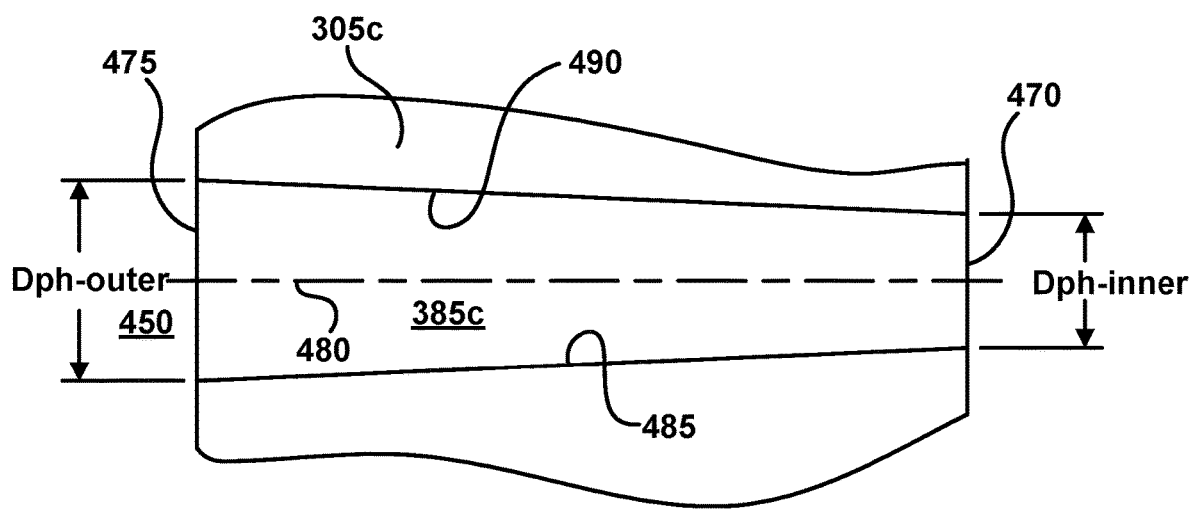
FIG. 11 is a cross-sectional view of a pilot hole for the fuel injector of FIG. 2 according to another embodiment.

The coefficient of discharge of pilot hole 385 can also be decreased (thereby reducing pilot injection quantity) by employing inwardly tapering pilot holes. With reference to FIG. 11, pilot hole 385c in main needle 305c (that can be employed in place of main needle 305 seen in FIG. 2) is illustrated with a geometry that reduces the coefficient of discharge. Pilot hole 385c includes inlet opening 470, into which pilot fuel enters downstream from pilot injection valve 350, and outlet opening 475, from which pilot fuel exits the pilot hole into combustion chamber 450. Surfaces of openings 470 and 475 are at right angles to longitudinal axis 480 of pilot hole 385c. When inlet and outlet openings 470, 475 of pilot hole 385c are not at right angles to longitudinal axis 480, openings 470 and 475 are defined to be the projection of these surfaces onto a plane that is at a right angle to longitudinal axis 480. Inlet diameter Dph-inner is the diameter of inlet opening 470, and diameter Dph-outer is the diameter of outlet opening 475, and diameters Dph-inner and Dph-outer are selected such that pilot hole 385c has an inwardly tapering profile. Diameter Dph-inner is less than diameter Dph-outer such that lines 485 and 490 extending between openings 470 and 475 are substantially linear and outwardly diverging with respect to pilot injection valve 350 and a cross-sectional area between inlet opening 470 and outlet opening 475 is outwardly diverging. The diverging nature of pilot hole 385c causes the pilot fuel to expand as it travels from inlet opening 470 to outlet opening 475, thereby increasing turbulence of the pilot fuel therein leading to a decreased coefficient of discharge.

The discharge coefficient for pilot hole 385 can also be reduced by employing cross-sectional shapes for the pilot hole other than typical circular shapes that reduce the coefficient of discharge of the pilot hole. Additionally, reducing a radius of a fillet, chamfer or bevel of an edge or corner of a perimeter of inlet opening 470 (seen in FIG. 11), whether the pilot hole is tapered or not, may also reduce the coefficient of discharge, thereby reducing the pilot injection quantity all else remaining the same.

The following transient state techniques have been contemplated to reduce an injection quantity of pilot fuel.

Referring to FIG. 1, pilot fuel injection quantity can be decreased by decreasing pilot fuel pressure in pilot-fuel rail 200 such that injection pressure is reduced. A pressure ratio between pilot fuel pressure (in rail 200) over in-cylinder pressure (as it is at the time of injection) in combustion chamber 450 of at least two (2) or greater is sufficient to ensure adequate atomization of pilot fuel in combustion chamber 450. In this regard, if a peak in-cylinder pressure near or at an end of a compression stroke is 40 bar, then a pilot fuel injection pressure of 80 bar is sufficient to ensure atomization of the pilot fuel (where the liquid pilot fuel droplets evaporate within the combustion chamber) such that the pilot fuel auto-ignites consistently from cycle to cycle with good ignition stability. Conventionally, liquid fuel injection pressures in diesel engines have increased to injection pressures of 2000 bar and beyond to improve combustion efficiency and to reduce emissions, particularly particulate emissions. However, when the quantity of pilot fuel is in the range of 0.67 to 2.67 mg/cycle it has been discovered that injection pressures of pilot fuel can be relaxed. Reducing injection pressure can have a further advantage of reducing parasitic losses since the pilot fuel and the gaseous fuel accordingly do not need to be pressurized to such high pressures. The pilot fuel can also be injected with advanced injection timing by injecting the pilot fuel earlier during the compression stroke when the in-cylinder pressure is less, thereby increasing the pressure ratio between the injection pressure of the pilot fuel over the in-cylinder pressure, or the injection pressure can be further reduced to maintain the same pressure ratio as a non-advanced injection timing.

Pilot fuel injection quantity can be decreased by improving the ability of pilot injection valve 350 to open and close quickly. With reference to FIG. 2, a response time of pilot actuation mechanism 360 can be improved to improve the transient response of pilot injection valve 350. For a given pressure ratio between pilot fuel injection pressure over in-cylinder pressure, a theoretical minimum pilot fuel injection quantity is defined by how fast pilot needle 300 can open and close such that an accurate quantity of pilot fuel can be injected consistently from cycle to cycle. Improving the transient response of pilot actuation mechanism 360 can include reducing a volume of control chamber 310 such that less fluid is required to be evacuated from control chamber 310 to open pilot injection valve 350, and less hydraulic fluid is required to fill control chamber 310 to close pilot injection valve 350. Additionally, flow areas through supply valve 361 and return valve 362 can be increased to increase the mass flow rate to and from control chamber 310, respectively, which will improve the response time of hydraulic forces acting on pilot needle 300 during the closing of pilot injection valve 350 and will reduce the time required for pilot needle 300 to evacuate hydraulic fluid out of control chamber 310 during the opening of pilot injection valve 350. Reducing a mass of pilot needle 300 reduces its inertia and therefore improves the acceleration of the pilot needle under the same forces thereby increasing an average velocity of the pilot needle during opening and during closing. Typically, pilot actuation mechanism 360 employs solenoid-type actuators to close supply valve 361 and to open return valve 362. Instead of solenoid-type actuators, piezoelectric-type actuators can be employed to close supply valve 361 and to open return valve 362. Alternatively, instead of pilot actuation mechanism 360 that controls flow of hydraulic fluid to and from pilot control chamber 310, in other embodiments a directly-acting, pilot-actuation mechanism that employs a piezoelectric actuator can be used to exert forces directly on the pilot needle whereby hydraulic fluid forces are not required to open and close the pilot needle. Piezoelectric actuators generally have faster response times than solenoid actuators and can create greater peak forces that act on supply valve 361, return valve 362 and the pilot needle (when directly acted upon by actuator forces), thereby allowing them to open and close more quickly that in turn allows pilot injection valve 350 to open and close more quickly leading to smaller pilot injection quantities; however, piezoelectric-type actuators are more expensive than solenoid-type actuators. Piezoelectric-type actuators may allow (increased) multiple injections per engine cycle more readily than solenoid-type actuators due to the improved transient response.

Pilot stroke length Lps (seen in FIG. 4) in other embodiments can be a variable stroke length whereby pilot actuation mechanism 360 (seen in FIG. 2) can be actuated to effect either a partial lift of pilot needle 300 or a full lift of pilot needle 300. The partial lift of pilot needle 300 occurs when the pilot needle stops during opening between a seated position on valve seat 320 and a fully open position (where preferably the pilot needle is physically stopped from opening any further). The flow area through pilot injection valve 350 is reduced when pilot needle 300 is opened to the partial lift position (of which there can be a plurality of partial lift positions between the seated position and the fully open position), which allows for the pilot injection quantity to be reduced. To effect partial lift of pilot needle 300, pilot actuation mechanism 360 can employ constant-air-gap type actuators (not shown), such as those disclosed in the Applicant's co-pending PCT international publication no. WO2020/186358, published on Sep. 24, 2020 to Seethaler et al. It should be noted that main actuation mechanism 370 can also employ constant-air-gap type actuators as well, such that the main needle can be actuated to one or more partial lift positions as well for increased control over gaseous fuel injection. Alternatively, partial lift of pilot needle 300 can be achieved when pilot actuation mechanism 360 employs piezoelectric actuators to effect the opening and closing of supply valve 361, return valve 362 and pilot needle 300 (when directly acted upon by actuator forces). Piezoelectric actuators can be actuated with varying control signals (specifically different voltage signals) that result in varying displacements of the piezoelectric actuator.

The following are other techniques that could be used to reduce the pilot injection quantity.

Figure 12:
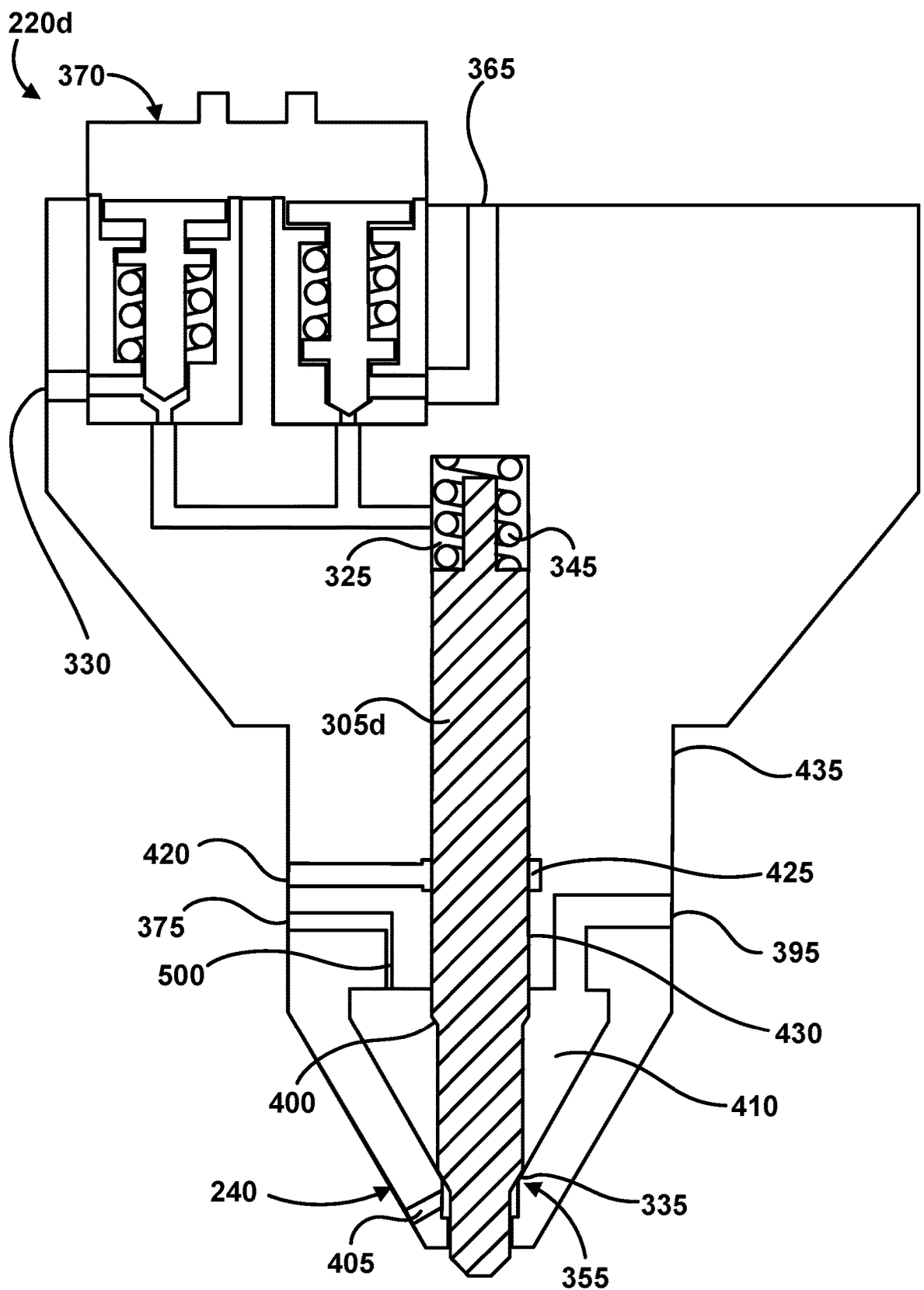
FIG. 12 is a schematic view of a fuel injector for the fuel system of FIG. 1 according to another embodiment.

Referring now to FIG. 12, there is shown fuel injector 220d that is like fuel injector 220 and only the differences are discussed. Fuel injector 220d includes orifice 500 that is fluidly connected to pilot fuel inlet 375 on one side and gaseous-fuel plenum 410 on another side. Orifice 500 allows a desired flow rate of pilot fuel to be fluidly communicated from pilot fuel inlet 375 into plenum 410, that is to leak or spill a desired quantity of pilot fuel into the plenum, whereby a gaseous-fuel/pilot-fuel mixture forms therein and is injected through main injection valve 355 and main hole 405. Orifice 500 permits a very small quantity of pilot fuel to be injected per engine cycle, thereby allowing smaller pilot fuel injection quantities. It is noteworthy that fuel injector 220d does not include pilot needle 300 (seen in FIG. 2), and therefore can employ main needle 305d that does not include a bore for a pilot needle, and the fuel injector does not require pilot actuation mechanism 360. In other embodiments, the hydraulic fluid is the pilot fuel and hydraulic fluid inlet 420 is a pilot fuel inlet, whereby match fit 430 can operate to permit the desired flow rate of pilot fuel into plenum 410, whereby inlet 375 and orifice 500 are not required.

In other embodiments, an effective pilot injection quantity can be reduced by reducing the carbon content of pilot fuel. For example, the pilot fuel can be diluted with an inert, low energy fluid forming a pilot-fuel/inert-fluid mixture where an injection quantity of the pilot-fuel/inert-fluid mixture can equal a pilot fuel injection quantity, yet the overall carbon content of the injected pilot-fuel/inert-fluid mixture is less than the carbon content of the injected pilot fuel quantity. Alternatively, or additionally, the pilot fuel could be a mixture of carbon-based liquid fuel, such as diesel, and a liquid with no carbon content, such as ammonia ($NH_3$), that can be injected. Ammonia is difficult to ignite since its ignition temperature and ignition energy are much higher than, for example, natural gas that itself is very difficult to auto-ignite. However, when ammonia is mixed and burned with a typical pilot fuel such as diesel it will ignite and burn when the pilot fuel ignites and burns, thus making the pilot-fuel/ammonia mixture an effective mixture for igniting hydrogen fuel and gaseous fuel blends comprising predominantly hydrogen, including gaseous fuels comprising 60% or more hydrogen. Pilot fuel can also be mixed with dimethyl ether (DME) having the chemical formula $CH_3OCH_3$, simplified to $C_2H_6O$, which has a reduced carbon content compared to diesel (a typical pilot fuel) having an average chemical formula of $C_{12}H_{23}$, ranging from approximately $C_{10}H_{20}$ to $C_{15}H_{28}$. Alternatively, or additionally, pilot fuel can be mixed with a synthetic diesel made from biosludge or secondary sludge, or propane (or liquefied petroleum gas) to reduce the carbon content of the overall mixture compared to using diesel fuel alone as the pilot fuel. In other embodiments, a viscosity of the pilot fuel can be increased, for example, by mixing a more viscous inert fluid with the pilot fuel. The viscosity of the pilot fuel can also be increased by lowering pilot fuel temperature. Lowering pilot fuel temperature can be accomplished by fluidly communicating the pilot fuel through a heat exchanger that employs a heat exchange fluid such as air (especially in a vehicle), a cryogenic fluid/fuel either before or after it has been vaporized, or a fluid (such as water) that has been cooled by an air conditioning unit. Alternatively, or additionally, the viscosity of the pilot fuel can be increased by employing a pilot fuel with increased viscosity compared to a viscosity of another pilot fuel. For example, biodiesel fuels typically have increased viscosity compared to petroleum diesel fuels. Petroleum diesel fuel, which is a typical pilot fuel, is a hydrocarbon mixture with generally approximately 10 to 15 carbon atoms per molecule (although molecules with fewer or more carbon atoms is possible) obtained by crude oil distillation. Biodiesel or FAME (fatty acid methyl ester) is an alternative diesel fuel derived from renewable feedstocks such as used cooking oils, rapeseed oil, animal fat or soybean oil, and can be obtained by transesterification.

In other embodiments, fuel injector 220 (seen in FIG. 2) can be split into two different injectors, where a first injector injects the gaseous main fuel, and a second injector injects the pilot fuel. Dedicating a single injector to injecting the pilot fuel allows for micro-pilot injections of smaller pilot injection quantities that cannot as easily be accomplished in a dual-fuel injector.

Figure 13:
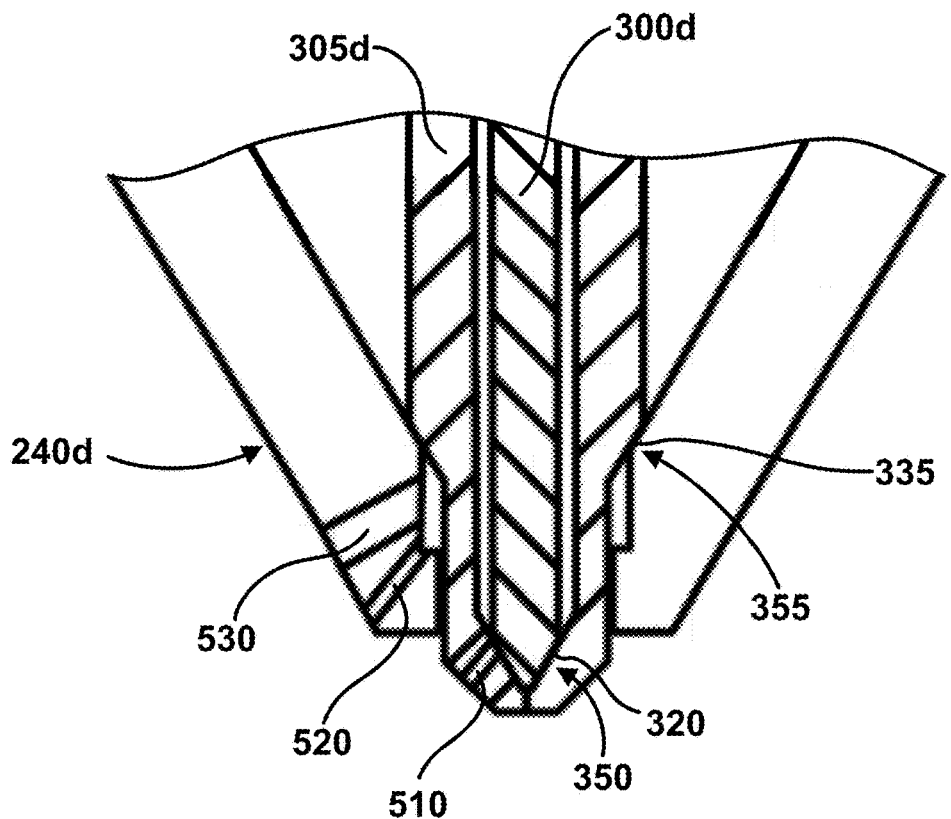
FIG. 13 is a schematic view of a nozzle for the fuel injector of FIG. 2 according to another embodiment.
Figure 14:
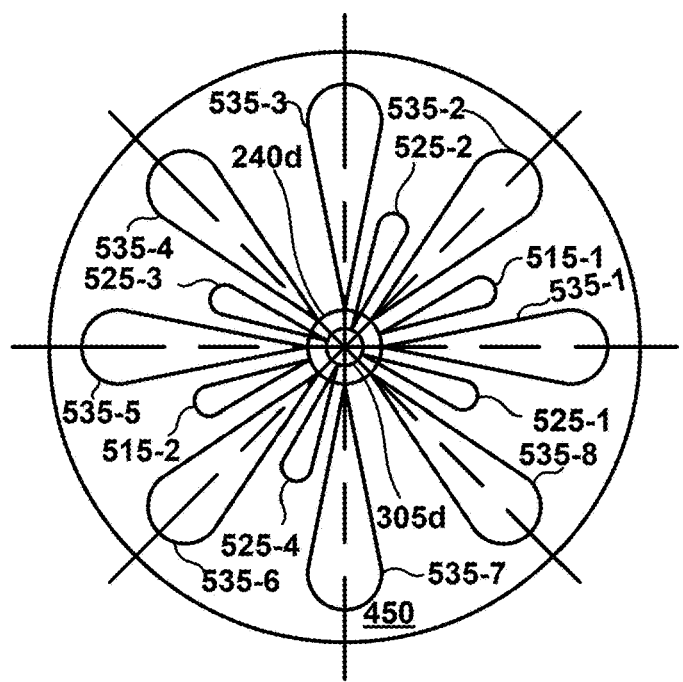
FIG. 14 is a plan view of a combustion chamber illustrating pilot jets, pilot gas jets, and main gas jets injected by a fuel injector capable of a cascade injection strategy.

Referring now to FIG. 13, nozzle 240d is shown according to another embodiment representative of a cascade injection strategy that can be employed in place of nozzle 240 in fuel injector 220 (seen in FIG. 2). Main needle 305d includes pilot holes 510 to inject the pilot fuel, and nozzle 240d includes pilot gas holes 520 to inject a pilot quantity of the gaseous fuel and main gas holes 530 to inject a main quantity of the gaseous fuel. The pilot fuel ignites and burns creating a pressure and temperature environment in the combustion chamber that ignites the pilot quantity of the gaseous fuel, whereby burning the pilot quantity of the gaseous fuel creates a pressure and temperature environment in the combustion chamber that ignites the main quantity of gaseous fuel. With reference to FIG. 14, in an exemplary embodiment there can be two pilot fuel holes 510 through which two pilot fuel jets 515-1,515-2 emerge that ignites four pilot gas jets 525-1, 525-2, 525-3, and 525-4 emerging through four pilot gas holes 520 that subsequently burns and ignites eight main gas jets 535-1, 535-2, 535-3, 535-4, 535-5, 535-6, 535-7, and 535-8 emerging through eight main gas holes 530. Preferably, each pilot jet 510-1 and 510-2 is evenly angularly spaced between pairs of pilot gas jets 525-1, 525-2 and 525-3, 525-4, respectively; and each pilot gas jet 525-1, 525-2, 525-3, and 525-4 are evenly angularly spaced between pairs of main gas jets 535-8, 535-1; 535-2, 535-3; 535-4, 535-5; and 535-6, 535-7, respectively. By employing the cascade injection strategy, a small quantity of pilot fuel can effectively ignite a larger quantity of gaseous fuel, that in turn can ignite an even larger quantity of gaseous fuel.

In exemplary embodiments, a combination of the techniques or levers hereinbefore disclosed are employed to precisely control the pilot injection quantity at each engine speed and engine load condition. In other embodiments, pilot actuation mechanism 360 seen in FIG. 2 can instead be a two-way valve that replaces supply valve 361 with a restriction orifice. It is also possible to instead replace return valve 362 with a restriction orifice although this will increase the steady state drainage of hydraulic fluid. Main actuation mechanism 370 can also be a two-way valve with a restriction orifice in other embodiments. By employing the other techniques disclosed herein for reducing pilot fuel injection quantity, the pilot fuel injection quantity of a fuel injector employing two-way-valve actuation mechanisms with restriction orifices can be reduced.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

We claim:

1. A method of operating a gaseous fuelled direct injection diesel cycle internal combustion engine, comprising
    introducing a quantity of gaseous fuel directly into a combustion chamber-of said engine, wherein said gaseous fuel comprises at least 60% hydrogen by volume at standard temperature and pressure,
    introducing a quantity of pilot fuel directly into said combustion chamber of said engine, such that the quantity of pilot fuel has a pilot energy ratio of less than 1% and greater than 0.26% of a total fuel introduced for at least one engine operating condition; and
    igniting said pilot fuel whereby combustion of said pilot fuel triggers the ignition of said gaseous fuel; and said engine maintains good ignition stability of the gaseous fuel for the at least one engine operating condition;
wherein over an entire engine operating map said pilot fuel is on average between 0.26% and 3% of the fuel that is consumed by said engine on an energy basis.

2. The method of claim 1, wherein the gaseous fuel is at least 97% on an energy basis of the total fuel introduced for the at least one engine operating condition.

3. The method of claim 1, further comprising maintaining a ratio of a pilot fuel rail pressure over an in-cylinder pressure of at least 2.0:1 when introducing said pilot fuel into said combustion chamber for the at least one engine operating condition.

4. The method of claim 1, wherein the at least one engine operating condition includes full load and/or peak power.

5. The method of claim 1, wherein said gaseous fuel comprises substantially hydrogen by volume at standard temperature and pressure.

6. The method of claim 1, further comprising injecting all the fuel during the compression stroke.

7. The method of claim 1, further comprising injecting pilot fuel with advanced injection timing by injecting the pilot fuel earlier during the compression stroke when in-cylinder pressure is less than peak in-cylinder pressure.

8. The method of claim 1, further comprising injecting pilot fuel directly into said combustion chamber about 1 millisecond before start of injection of said gaseous fuel.

9. A method for injecting a pilot fuel into a combustion chamber of an internal combustion engine, the internal combustion engine burning the pilot fuel and a main gaseous fuel in the combustion chamber, the internal combustion engine including a fuel injector including a pilot injection valve having a pilot needle and a pilot valve-seat, the fuel injector having a plurality of pilot holes for fluidly communicating the pilot fuel from the pilot injection valve into the combustion chamber, the method comprising:
    introducing a quantity of main gaseous fuel into a combustion chamber of said engine;
    introducing a quantity of pilot fuel, more readily ignitable than the main gaseous fuel, directly into said combustion chamber of said engine;
    igniting said pilot fuel whereby combustion of said pilot fuel triggers the ignition of the main gaseous fuel such that said engine maintains good ignition stability of the main gaseous fuel for at least one engine operating condition;
wherein the quantity of pilot fuel is less than 1% and greater than 0.26% of a total fuel quantity, the total fuel quantity being a sum of the quantity of pilot fuel and the quantity of main gaseous fuel injected per engine cycle on an energy basis; and
wherein over an entire engine operating map said pilot fuel is on average between 0.26% and 3% of the fuel that is consumed by said engine on an energy basis.

10. The method of claim 9, wherein over the entire engine operating map the quantity of pilot fuel is on average between 0.26% and 2.09% of the total fuel quantity that is consumed by said engine on an energy basis.

11. The method of claim 9, wherein the main gaseous fuel comprises greater than 70% hydrogen by volume at standard temperature and pressure.

12. The method of claim 9, wherein the main gaseous fuel comprises greater than 90% hydrogen by volume at standard temperature and pressure.

13. The method of claim 9, further comprising injecting all the fuel during the compression stroke.

14. The method of claim 9, further comprising providing each of the plurality of pilot holes of the fuel injector with an inwardly tapering profile.

15. The method of claim 9, further comprising actuating the pilot needle to a partial lift position between a seated position and a fully open position.

16. The method of claim 9, further comprising mixing the pilot fuel with an inert fluid; and/or mixing the pilot fuel with ammonia.

17. The method of claim 9, wherein the fuel injector is a dual fuel injector.

18. The method of claim 9, wherein the at least one engine operating condition includes full load.

19. The method of claim 9, wherein the at least one engine operating condition includes peak power.

* * * * *